United States Patent
Ahn et al.

(10) Patent No.: US 11,570,402 B2
(45) Date of Patent: Jan. 31, 2023

(54) TERMINAL AND OPERATING METHOD THEREOF

(71) Applicant: Hyperconnect Inc., Seoul (KR)

(72) Inventors: Sangil Ahn, Cheongju-si (KR); Byungjong Kim, Hanam-si (KR)

(73) Assignee: Hyperconnect Inc., Seoul (KR)

( * ) Notice: Subject to any disclaimer, the term of this patent is extended or adjusted under 35 U.S.C. 154(b) by 0 days.

(21) Appl. No.: 16/845,612

(22) Filed: Apr. 10, 2020

(65) Prior Publication Data
US 2021/0266498 A1 Aug. 26, 2021

(30) Foreign Application Priority Data
Feb. 21, 2020 (KR) .......... 10-2020-0021546

(51) Int. Cl.
*H04N 7/14* (2006.01)
*G06F 16/9535* (2019.01)
*H04L 51/52* (2022.01)

(52) U.S. Cl.
CPC ......... *H04N 7/144* (2013.01); *G06F 16/9535* (2019.01); *H04L 51/52* (2022.05)

(58) Field of Classification Search
CPC ......... G06F 14/30371; G06F 17/30867; H04L 67/306; H04N 7/141; H04N 7/147; H04N 7/148; H04N 7/152; H04N 7/15; H04N 7/42
USPC ....................................................... 709/204
See application file for complete search history.

(56) References Cited

U.S. PATENT DOCUMENTS

| 8,812,519 | B1 | 8/2014 | Bent |
| 8,867,849 | B1 | 10/2014 | Kirkham et al. |
| 9,531,998 | B1 | 12/2016 | Farrell et al. |
| 9,699,630 | B2 * | 7/2017 | Rhim ............... H04W 4/16 |
| 9,733,811 | B2 * | 8/2017 | Rad ............... G06Q 10/10 |
| 10,384,136 | B2 | 8/2019 | Chae et al. |

(Continued)

FOREIGN PATENT DOCUMENTS

| CN | 101827317 A | 9/2010 |
| CN | 104737097 A | 6/2015 |

(Continued)

OTHER PUBLICATIONS

Extended European Search Report for European Application No. 20214672.6, Search completed Mar. 12, 2021, dated Mar. 24, 2021, 10 Pgs.

(Continued)

*Primary Examiner* — Maria El-Zoobi
(74) *Attorney, Agent, or Firm* — KPPB LLP (57) ABSTRACT

A terminal includes a communication interface for receiving a plurality of profile information from a plurality of terminals, an input/output interface for receiving a first signal generated by a user of the terminal based on a certain profile information of the plurality of profile information, and a processor for checking whether the terminal has a history of receiving a second signal from a terminal that provided the certain profile information, and for attempting, by the terminal, a video call to the terminal that provided the certain profile information depending on a result of the check, and the input/output interface may display the certain profile information and video call waiting time during the video call waiting time after attempting the video call.

15 Claims, 7 Drawing Sheets

(56) References Cited

U.S. PATENT DOCUMENTS

| | | | |
|---|---|---|---|
| 10,599,734 B2 | 3/2020 | Ahn et al. | |
| 10,706,118 B1 | 7/2020 | Yang et al. | |
| 10,810,276 B2 | 10/2020 | Ahn et al. | |
| 10,984,488 B1 | 4/2021 | Colucci | |
| 11,296,898 B2 | 4/2022 | Ahn et al. | |
| 11,301,534 B2 | 4/2022 | Ahn et al. | |
| 11,457,077 B2 | 9/2022 | Ahn et al. | |
| 2004/0076280 A1 | 4/2004 | Ando et al. | |
| 2004/0107144 A1 | 6/2004 | Short | |
| 2005/0047576 A1* | 3/2005 | Hidesawa | H04M 3/5238 379/215.01 |
| 2008/0080745 A1 | 4/2008 | Vanhoucke et al. | |
| 2009/0271244 A1 | 10/2009 | Kalasapur et al. | |
| 2011/0289433 A1 | 11/2011 | Whalin et al. | |
| 2012/0004954 A1 | 1/2012 | Eisinger et al. | |
| 2014/0040368 A1* | 2/2014 | Janssens | H04L 67/306 709/204 |
| 2014/0074824 A1 | 3/2014 | Rad et al. | |
| 2014/0172893 A1 | 6/2014 | Carter | |
| 2014/0280600 A1 | 9/2014 | Jeon | |
| 2015/0067070 A1 | 3/2015 | Jacques et al. | |
| 2015/0341297 A1* | 11/2015 | Barfield, Jr. | H04L 51/52 709/206 |
| 2015/0352451 A1 | 12/2015 | Brenden et al. | |
| 2016/0043987 A1 | 2/2016 | Ahn et al. | |
| 2016/0055571 A1 | 2/2016 | Wouhaybi et al. | |
| 2016/0127500 A1 | 5/2016 | Rad | |
| 2016/0307259 A1* | 10/2016 | Lubeck | G06Q 30/0635 |
| 2017/0127123 A1 | 5/2017 | Lidow et al. | |
| 2017/0142482 A1 | 5/2017 | Zhou | |
| 2017/0351770 A1 | 12/2017 | Ahn et al. | |
| 2018/0046946 A1 | 2/2018 | Mason, Jr. et al. | |
| 2018/0048597 A1 | 2/2018 | Li et al. | |
| 2018/0349703 A1 | 12/2018 | Rathod | |
| 2019/0281093 A1 | 9/2019 | Ahn et al. | |
| 2019/0370556 A1 | 12/2019 | Kline et al. | |
| 2020/0110788 A1 | 4/2020 | Ahn et al. | |
| 2020/0145609 A1 | 5/2020 | Ahn et al. | |
| 2020/0226193 A1 | 7/2020 | Ahn et al. | |
| 2021/0011966 A1 | 1/2021 | Ahn et al. | |
| 2021/0065314 A1 | 3/2021 | Storment et al. | |
| 2021/0067362 A1 | 3/2021 | Ahn et al. | |
| 2021/0075883 A1 | 3/2021 | Ahn et al. | |
| 2021/0182536 A1 | 6/2021 | Ahn et al. | |
| 2022/0092140 A1 | 3/2022 | Ahn et al. | |

FOREIGN PATENT DOCUMENTS

| | | |
|---|---|---|
| CN | 105247845 A | 1/2016 |
| CN | 105308638 A | 2/2016 |
| EP | 2849411 A1 | 3/2015 |
| JP | 2002109025 A | 4/2002 |
| JP | 2005018358 A | 1/2005 |
| JP | 2005092897 A | 4/2005 |
| JP | 2005136524 A | 5/2005 |
| JP | 2006197002 A | 7/2006 |
| JP | 2008022109 A | 1/2008 |
| JP | 2008245113 A | 10/2008 |
| JP | 2011077909 A | 4/2011 |
| JP | 2011081575 A | 4/2011 |
| JP | 2013020485 A | 1/2013 |
| JP | 2015517153 A | 6/2015 |
| JP | 2015519852 A | 7/2015 |
| JP | 2016076078 A | 5/2016 |
| JP | 2016152521 A | 8/2016 |
| JP | 2017045342 A | 3/2017 |
| JP | 2017138948 A | 8/2017 |
| JP | 2018077590 A | 5/2018 |
| JP | 2018120461 A | 8/2018 |
| JP | 2019088004 A | 6/2019 |
| JP | 2019149057 A | 9/2019 |
| KR | 20000054824 A | 9/2000 |
| KR | 20030094156 A | 12/2003 |
| KR | 1020050111838 A | 11/2005 |
| KR | 20060056680 A | 5/2006 |
| KR | 20090014473 A | 2/2009 |
| KR | 20090065147 A | 6/2009 |
| KR | 20100023465 A | 3/2010 |
| KR | 20110035651 A | 4/2011 |
| KR | 20130012155 A | 2/2013 |
| KR | 20130057936 A | 6/2013 |
| KR | 20140087175 A | 7/2014 |
| KR | 20150010988 A | 1/2015 |
| KR | 20150029772 A | 3/2015 |
| KR | 20150055634 A | 5/2015 |
| KR | 1020150056504 A | 5/2015 |
| KR | 101700115 B1 | 1/2017 |
| KR | 20190077654 A | 7/2019 |
| KR | 20190080377 A | 7/2019 |
| WO | 0167760 A1 | 9/2001 |
| WO | 2013081345 A1 | 6/2013 |
| WO | 2015036817 A1 | 3/2015 |
| WO | 2017080169 A1 | 5/2017 |

OTHER PUBLICATIONS

Bao et al., "CVAE-GAN: Fine-Grained Image Generation through Asymmetric Training," Arxiv.Org, Cornell University Library, 201 Olin Library Cornell University Ithaca, NY 14853, Mar. 29, 2017, pp. 1-15.

Iyengar et al., "Koinophilia and human facial attractiveness," Resonance-Journal of Science Education, Indian Academy of Sciences, India, vol. 20, No. 4, May 3, 2015, pp. 311-319.

Extended European Search Report for Application No. 20192980.9, dated Sep. 28, 2020, 8 Pgs.

Extended European Search Report for European Application No. 20195016.9, Search completed Nov. 20, 2020, dated Dec. 3, 2020, 9 Pgs.

First Office Action of corresponding Korean Patent Application 10-2016-0069563, dated Dec. 8, 2016, 9 Pgs.

International Search Report and Written Opinion for International Application No. PCT/KR2018/001315, Search completed May 16, 2021, dated May 17, 2018, 11 Pgs.

Korean Office Action for Application No. 10-2019-0104869, dated Jul. 21, 2020, 10 Pgs.

Korean Office Action for Application No. 10-2019-0111491, dated Aug. 24, 2020, 11 Pgs.

Office Action of corresponding Chinese Patent Application No. 2017-10407120.7, dated Aug. 5, 2019, 16 Pgs.

Japanese Office Action for Application No. 2020-137009, dated Aug. 12, 2021.

Japanese Office Action for Application No. 2020-208565 dated Dec. 22, 2021, 3 pages.

Korean Office Action for Application No. 2020-085492051, dated Dec. 7, 2020, 6 pgs.

* cited by examiner

TERMINAL AND OPERATING METHOD THEREOF

CROSS-REFERENCE TO THE RELATED APPLICATION

This application is based on and claims priority from Korean Patent Application No. 10-2020-0021546 filed on Feb. 21, 2020 in the Korean Intellectual Property Office, the disclosure of which is incorporated herein in its entirety by reference.

BACKGROUND

1. Field

The embodiments described herein relate to a terminal that enables a more effective matching with a counterpart, and an operating method thereof.

2. Description of the Related Art

With the development of communication technology and miniaturization of electronic devices, terminals that can be easily carried are being widely used among general consumers. In particular, recently, portable terminals such as smart phones or smart tablets are being widely used. Most terminals contain communication function. A user can use a terminal to perform searches on the Internet or exchange messages with other users.

The user and the other users may already know each other, or they may not know each other. The terminal of the user can be connected with a plurality of terminals including the terminal of the other user. The user and the other users can exchange messages with each other through the terminals. Of the plurality of terminals, the terminal of the user and the terminal of the other user can be matched with each other. Even when the user and the other user do not know each other, they can exchange messages or perform video calls with each other.

SUMMARY

According to the embodiments described herein, a terminal that enables a more effective matching with a counterpart, and an operating method thereof, may be provided.

Further, according to the embodiments, a terminal that enables expanding human relations through mediation services, and an operating method thereof, may be provided.

A terminal operating method according to an embodiment of the present disclosure may include receiving, by a terminal, a plurality of profile information from a plurality of terminals except for the terminal, transmitting a first signal generated by a user of the terminal based on a certain profile information of the plurality of profile information, checking whether the terminal has a history of receiving a second signal from a terminal that provided the certain profile information, attempting, by the terminal, a video call to the terminal that provided the certain profile information, depending on a result of the check, and after attempting the video call, displaying the certain profile information and video call waiting time during the video call waiting time.

Further, the user of the terminal may have a first gender, and users of the plurality of terminals may have a second gender.

Further, the displaying the certain profile information and video call waiting time during the video call waiting time may display a screen of sequentially counting down the video call waiting time.

Further, in response to the terminal that provided the certain profile not receiving the video call until the video call waiting time ends, a message window for the user of the terminal to send a message to the terminal that provided the certain profile, may be displayed.

Further, in response to the terminal that provided the certain profile declining the video call during the video call waiting time, a message window for the user of the terminal to send a message to the terminal that provided the certain profile, may be displayed.

Further, the certain profile information may include at least one of photographs, hobby information, nickname information, height information, date of birth information, gender information, residential area information, school information, and videos of the user of the terminal that provided the certain profile information.

Further, the first signal may be a favorable signal regarding the certain profile information, and the second signal may be a favorable signal regarding the profile information of the terminal.

A terminal according to an embodiment of the present disclosure may include a communication interface for receiving a plurality of profile information from a plurality of terminals, an input/output interface for receiving a first signal generated by a user of the terminal based on a certain profile information of the plurality of profile information, and a processor for checking whether the terminal has a history of receiving a second signal from a terminal that provided the certain profile information, and for attempting, by the terminal, a video call to the terminal that provided the certain profile information depending on a result of the check, and the input/output interface may display the certain profile information and video call waiting time during the video call waiting time after attempting the video call.

Further, a user of the terminal may have a first gender, and users of the plurality of terminals may have a second gender.

Further, the input/output interface may display a screen of sequentially counting down the video call waiting time.

Further, in response to the terminal that provided the certain profile not receiving the video call until the video call waiting time ends, the input/output interface may display a message window for the user of the terminal to send a message to the terminal that provided the certain profile.

Further, in response to the terminal that provided the certain profile declining the video call during the video call waiting time, the input/output interface may display a message window for the user of the terminal to send a message to the terminal that provided the certain profile.

Further, the certain profile information may include at least one of photographs, hobby information, nickname information, height information, date of birth information, gender information, residential area information, school information, and videos of the user of the terminal that provided the certain profile information.

Further, the first signal may be a favorable signal regarding the certain profile information, and the second signal may be a favorable signal regarding the profile information of the terminal.

According to the embodiments described herein, users of terminals can be matched with each other more effectively.

Further, according to the embodiments, through mediation services, users of terminals can expand human relations.

DETAILED DESCRIPTION

Advantages and features of the present disclosure, and methods for achieving them will be clarified with reference to embodiments described below in detail together with the accompanying drawings. However, the present disclosure is not limited to the embodiments described below, but will be implemented in various different forms, and the embodiments are provided to allow the present disclosure to be complete, and to fully inform one skilled in the related art with the scope of the present disclosure, and the present disclosure is only defined by the scope of the claims. Throughout the specification, like reference numerals indicate like components.

Even though "a first" or "a second" and the like are used to describe various components, these components are not limited by the aforementioned terms. The aforementioned terms may only be used to differentiate one component from other components. Therefore, a first component mentioned hereinafter may be a second component within the technical idea of the present disclosure.

The terms used in the present specification are for the purpose of only describing the embodiments and are not intended to limit the present disclosure. In the present specification, singular expressions include plural expressions unless the context clearly indicates otherwise. Terms such as "comprises" or "comprising" used in the specification are intended to indicate that possibility of presence or addition of one or more other components or steps is not excluded.

Unless defined otherwise, all the terms used in the present specification have the same meanings as they would be commonly understood by a person skilled in the related art. Further, the terms defined in generally used dictionaries should not be construed ideally or overly unless clearly defined specially.

Figure 1:
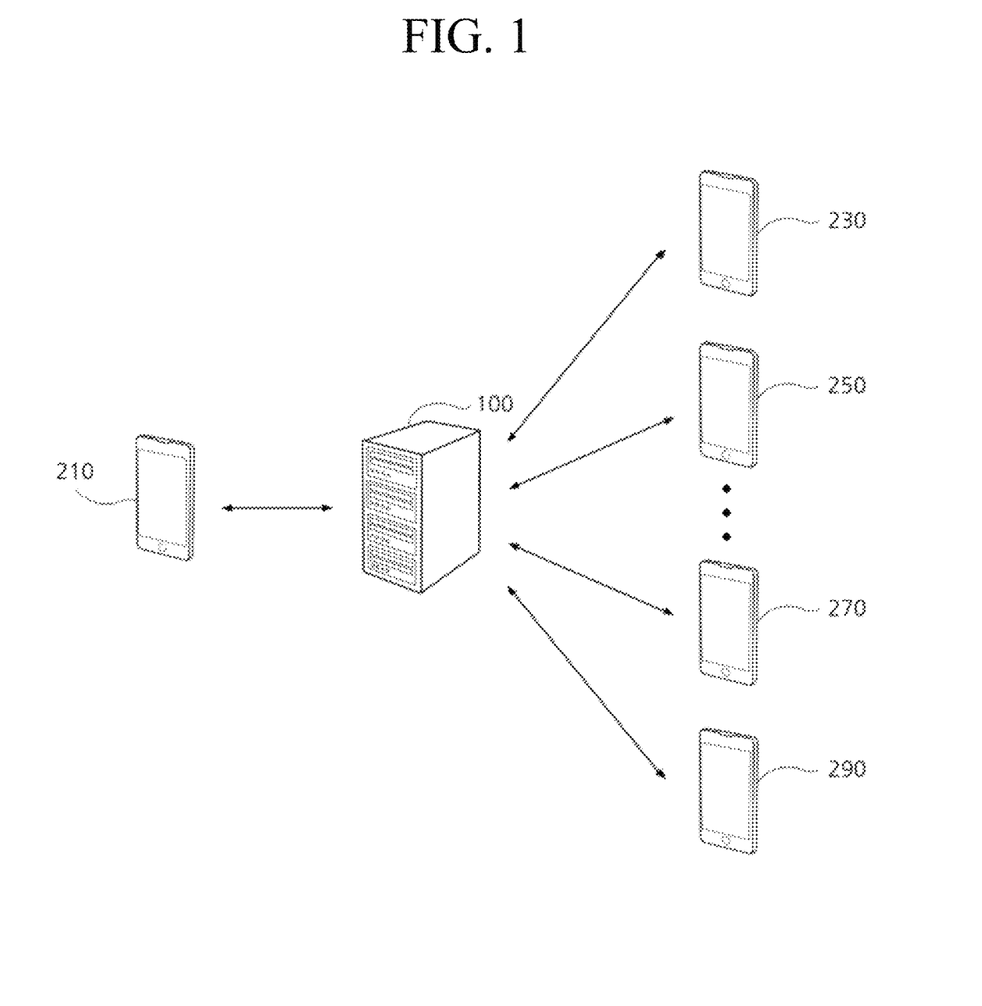
FIG. 1 is a network configuration diagram illustrating an environment of a server system where the server operates, according to an embodiment of the present disclosure.

FIG. 1 is a network configuration diagram illustrating an environment of a server system where a server operates, according to an embodiment of the present disclosure.

Referring to FIG. 1, the environment of the server system may include a server 100 and a plurality of terminals 210~290.

The server 100 may be a mediation device that connects between the plurality of terminals 210~290. The server 100 may provide a mediation service so that data can be transceived between the plurality of terminals 210~290. The server 100 and the plurality of terminals 210~290 may be connected with a communication network. The server 100 may transmit data to the plurality of terminals 210~290 or receive data from the plurality of terminals 210~290 through the communication network.

The communication network may be implemented as one of wired communication network, wireless communication network, and composite communication network. For example, the communication network may include a mobile communication network such as 3G, Long Term Evolution (LTE), and LTE-A, etc. The communication network may include a wired or wireless communication network such as Wi-Fi, Universal Mobile Telecommunisations System (UMTS)/General Packet Radio Service (GPRS), or Ethernet, etc.

The communication network may include a local area communication network such as Magnetic Secure Transmission (MST), Radio Frequency IDentification (RFID), Near Field Communication (NFC), Zig Bee, Z-Wave, Bluetooth, Bluetooth Low Energy (BLE), or InfraRed communication (IR), etc. The communication network may include Local Area Network (LAN), Metropolitan Area Network (MAN), or Wide Area Network (WAN), etc.

The server 100 may receive profile information from each of the plurality of terminals 210~290. The profile information may include at least one of photographs, hobby information, nickname information, height information, date of birth information, gender information, residential area information, school information, and videos of a user of each of the plurality of terminals 210~290.

The server 100 may provide the users having a first gender with the profile information of the users having a second gender. On the contrary, the server 100 may provide the users having the second gender with the profile information of the users having the first gender.

Each of the plurality of terminals 210~290 may be connected by the medium of the server 100. For convenience of explanation of the present disclosure, five terminals are illustrated in FIG. 1. However, the number of the terminals is not limited to five.

The plurality of terminals 210~290 may each be implemented as one of desktop computer, laptop computer, smart phone, smart tablet, smart watch, mobile terminal, digital camera, wearable device, or portable electronic device. The plurality of terminals 210~290 may execute a program or application. In some embodiments, the plurality of terminals 210~290 may execute an application that can be provided with the mediation service.

In some embodiments, when the first terminal 210 executes the application, the first terminal 210 may receive the profile information of some of the users of the second terminals 230-290 from the server 100. These some of the users may have a different gender from the user of the first terminal 210.

That is, the user of the first terminal 210 may receive profiles of some of the users of the second terminals 230-290, and perform communication. Through such a mediation service, human relations of the user of the first terminal 210 can be expanded.

Figure 2:
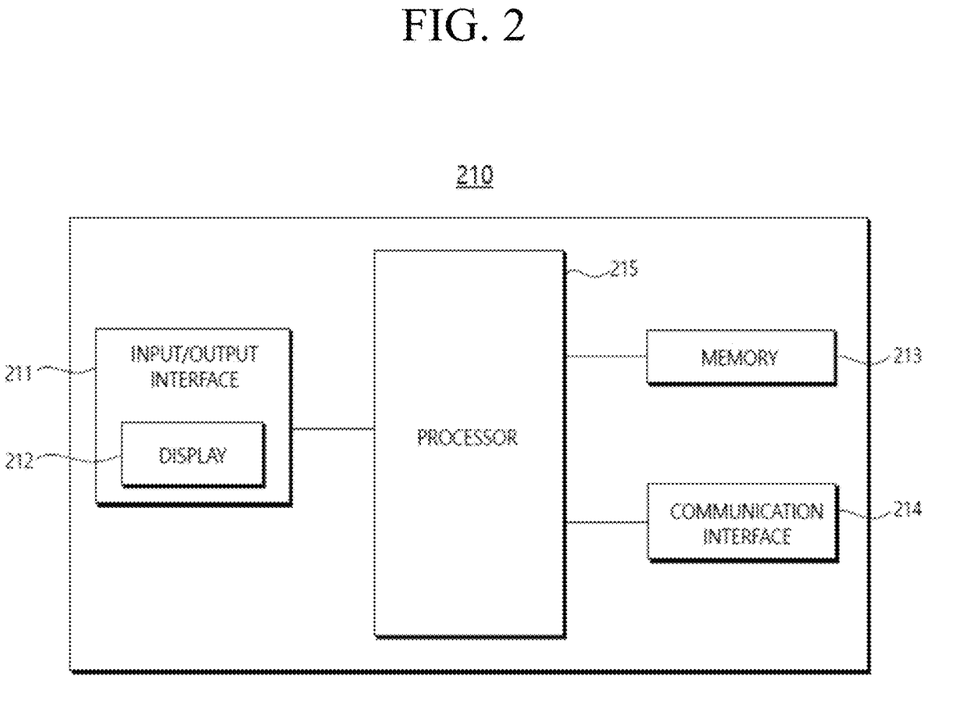
FIG. 2 is a block diagram illustrating a configuration of a terminal according to an embodiment of the present disclosure.

FIG. 2 is a block diagram illustrating a configuration of a terminal according to an embodiment of the present disclosure. Referring to FIG. 2, the first terminal 210 may include an input/output interface 211, a display 212, a memory 213, a communication interface 214, and a processor 215. Each of the second to fifth terminals 230-290 illustrated in FIG. 1 may be implemented in a similar or same manner as the first terminal 210.

The input/output interface 211 may receive a signal from outside. The input/output interface 211 may receive the signal from the user of the first terminal 210. Further, the input/output interface 211 may receive the signal from an external device. The input/output interface 211 may include, for example, microphone, camera, keyboard, mouse, trackball, touchscreen, button, switch, sensor, network interface, or other input devices, etc. The input/output interface 211 may receive a voice from outside, through the microphone included in the input/output interface 211.

Further, the input/output interface 211 may receive an image or video photographed by the camera (not illustrated) included in the input/output interface 211, or receive a gesture from the user of the first terminal 210.

The input/output interface 211 may include a display 212. For example, the display 212 may include a flat panel display device such as Liquid Crystal Display (LCD), Organic Light Emitting Diode (OLED), or Plasma Display Panel (PDP), etc. The display 212 may include a curved display or flexible display. The display 212 may include a touch screen. If the display 212 includes the touch screen, the display 212 may receive a touch input from the user of the first terminal 210.

The display 212 may display data. Further, the display 212 may display a result of computation performed by the processor 215. Otherwise, the display 212 may display the data stored in the memory 213. The display 212 may display the data being received through the input/output interface 211 or the data being received by the communication interface 214.

In some embodiments, when the mediation service is implemented in the first terminal 210, the display 212 may output the plurality of profile information received from the server 100. The display 212 may sequentially output the plurality of profile information.

The display 212 may receive a certain input from the user regarding each of the plurality of profile information being displayed sequentially. For example, the certain input may be an input representing the favorability towards the user of the terminal corresponding to each of the plurality of profile information. Otherwise, the certain input may not represent the favorability towards the profile information being displayed, but may instead be a pass input in order to see other profile information.

In some embodiments, in the case where the first terminal 210 provides the mediation service, the input/output interface 211 may receive the profile information received from the user of the first terminal 210 or receive a user input. For example, the profile information of the user may include at least one of photographs, hobby information, gender information, country information, or age information of the user of the first terminal 210. Further the profile information of the user may further include a video photographed by the user. In addition, the user input may be a touch input being received from the user of the first terminal 210.

The memory 213 may store data. The memory 213 may store voice data, image data or the profile information of the user received from the input/output interface 211. Further, the memory 213 may store the result of computation performed by the processor 215. For example, the memory 213 may store a voice encoded by the processor 215. The memory 213 may store the data to be output externally through the communication interface 214, or store the data received from outside through the communication interface 214.

The memory 213 may store a software or program. For example, the memory 213 may store programs and various types of data such as application, and application programming interface (API), etc. The memory 213 may store instructions that are executable by the processor 215.

The memory 213 may include at least one of a volatile memory or nonvolatile memory. The memory 213 may include at least one of, for example, flash memory, ROM, RAM, EEROM, EPROM, EEPROM, hard disk drive, or register. The memory 213 may include, for example, a file system, database, or embedded database, etc.

The communication interface 214 may output the data outside the first terminal 210 or receive the data from outside. The communication interface 214 may output the data to the server 100 or to an external device. The communication interface 214 may receive the data from the server 100 and the external device. The communication interface 214 may output the result of computation performed by the processor 215 to outside.

In some embodiments, when an input representing a favorability towards the user of the terminal corresponding to each of the plurality of profile information, is received in the display 212, the communication interface 214 may output a favorable signal. Otherwise, if, instead of expressing favorability regarding the profile information being displayed on the display 212, a pass input is received in order to see other profile information, the communication interface 214 may output a pass signal.

The communication interface 214 may include a remote area network interface such as, for example, 3G module, LTE module, LTE-A module, Wi-Fi module, WiGig module, Ultra Wide Band (UWB) module, or LAN card, etc. Further, the communication interface 214 may include a local area network interface such as, for example, Magnetic Security Transmission (MST) module, Bluetooth module, NFC module, RFID module, ZigBee module, Z-Wave module, or infrared module, etc. Further, the communication interface 214 may include other network interfaces.

In some embodiments, the communication interface 214 may receive a plurality of profile information from the server 100. The plurality of profile information may be information selected based on a certain standard of the server 100. In some embodiments, the plurality of profile information may be the profile information of users selected based on a matching history with users having the same characteristics as the user of the first terminal 210. The plurality of profile information may be selected in a method described based on FIGS. 3 to 7.

The processor 215 or each of the components included in the processor 215 may be implemented in the form of software or hardware. For example, the software may be implemented as program execution instructions such as machine code, firmware code, embedded code, and application, etc. The hardware may be an electrical and electronic circuit, processor, computer, pressure sensor, inertial sensor, MEMS, passive elements, or a combination thereof.

The processor 215 may control operations of the first terminal 210. The processor 215 may be interconnected with each of the components included in the first terminal 210, and may control operations of each of the components included in the first terminal 210. In response to the signal received by the input/output interface 211, the processor 215 may control the operations of the first terminal 210.

In some embodiments, the processor 215 may determine an order in which the plurality of profile information are to be displayed through the display. In some embodiments, the processor 215 may control the display 212 to display the profile information of the users based on a history of exchanging mutually favorable signals with the users having the same characteristics as the user of the first terminal 210.

The method for displaying the plurality of profile information on the display 212 is not limited to the embodiment described above. The processor 215 may control the display 212 to display the plurality of profile information in various combinations of order.

Figure 3:
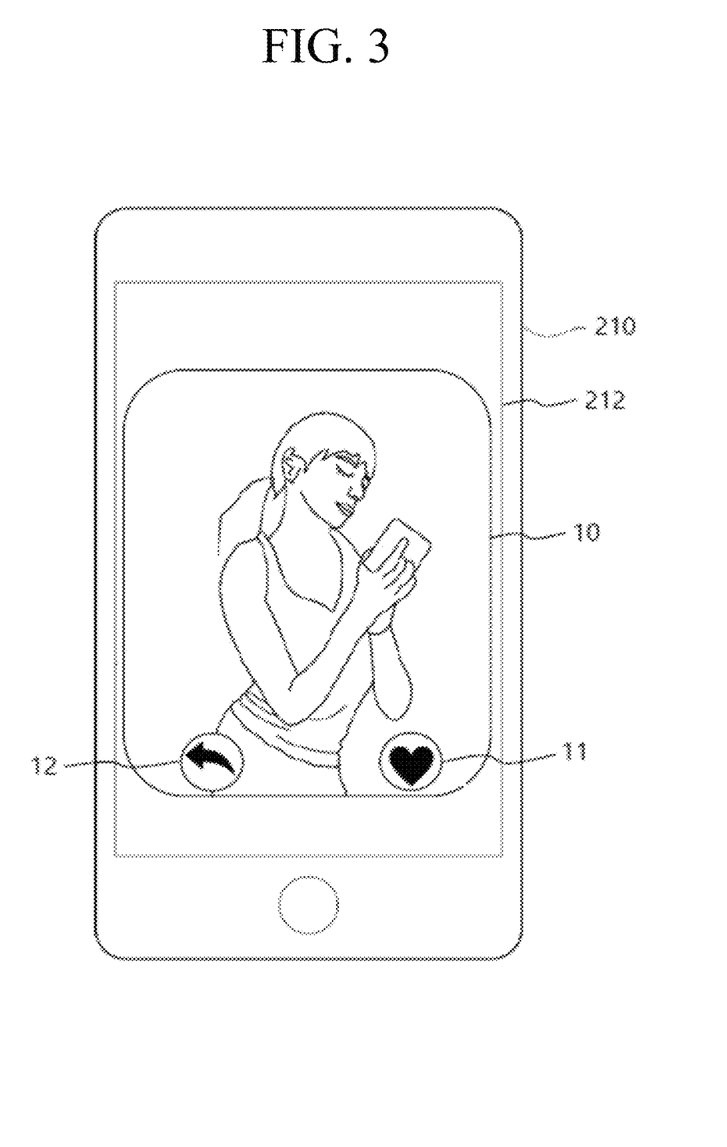
FIG. 3 is a view illustrating a method for displaying a profile information of a counterpart on a terminal, according to an embodiment of the present disclosure.

FIG. 3 is a view illustrating a method for displaying the profile information of a counterpart on a terminal, according to an embodiment of the present disclosure.

In a partial area of the display 212 of the first terminal 210, a first profile information 10, of the plurality of profile information, may be displayed. The first profile information 10 may be provided from one of the plurality of terminals 230-290 except for the first terminal 210.

In some embodiments, it may be assumed that the first profile information 10 is provided from the second terminal 230. Further, a user of the second terminal 230 may have a different gender from that of the user of the first terminal 210. For example, if the user of the first terminal 210 has a first gender (for example, female), the user of the second terminal 230 may have a second gender (for example, male).

In some embodiments, the first profile information 10 may include at least one of an image or video designated by the user of the second terminal 230. For example, the first profile information 10 may include the image or video including a face of the user of the second terminal 230.

In some embodiments, on the display 212 of the first terminal 210, a favorability icon 11 and a pass icon 12 may be displayed. The user of the first terminal 210 may select one of the favorability icon 11 and the pass icon 12 based on the first profile information 10.

When the user of the first terminal 210 wishes to conduct a one-to-one communication with the user that provided the first profile information 10, the user may select the favorability icon 11. On the contrary, when the user of the first terminal 210 wishes not to conduct the one-to-one communication with the user that provided the first profile 10, the user may select the pass icon 12.

When an input of touching the favorability icon 11 is received in the first terminal 210, a favorable signal is generated, and the generated favorable signal may be transmitted to the server 100 or the second terminal 230.

In some embodiments, before the favorable signal is generated in the first terminal 210, the first terminal 210 or the server 100 may receive a favorable signal from the second terminal 230, generated based on the profile information of the user of the first terminal 210. If the first terminal 210 generates the favorable signal based on the first profile information 10 provided from the second terminal 230 after receiving the favorable signal from the second terminal 230, the first terminal 210 and the second terminal 230 may be matched.

Figure 4:
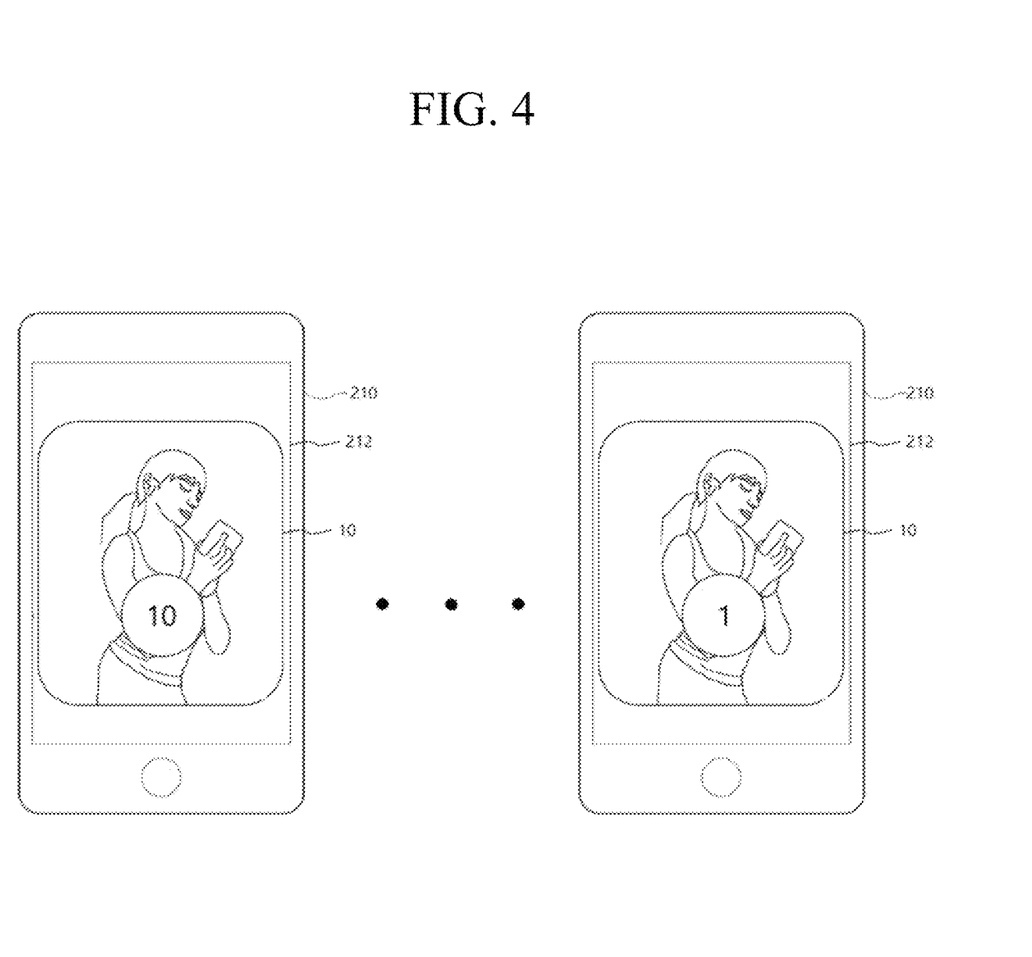
FIG. 4 is a view illustrating a video call waiting screen of a terminal, according to an embodiment of the present disclosure.

FIG. 4 is a view illustrating a video call waiting screen of a terminal, according to an embodiment of the present disclosure.

Referring to FIGS. 3 and 4, when the first terminal 210 and the second terminal 230 are matched, the first terminal 210 may attempt a video call to the second terminal 230. During a video call waiting time, the display 212 of the first terminal 210 may display the first profile information 10.

In prior art, on the terminal sending the video call, images being photographed by the camera of the terminal sending the video call used to be displayed during the video call waiting time. On the other hand, the first terminal 210 according to an embodiment of the present disclosure displays the first profile information 10 provided by the receiving side terminal (for example, the second terminal 230) during the video call waiting time, thereby using the waiting time more efficiently.

Further, the display 212 of the first terminal 210 may display the remaining waiting time. For example, when the video call waiting time is 10 seconds, the display 212 of the first terminal 210 may display a screen of sequentially counting down from '10' to '1'. If the user of the second terminal 230 receives the video call before the waiting time ends, a video call session is established between the first terminal 210 and the second terminal 230, and the display 212 of the first terminal 210 may display a video being received from the second terminal 230.

If the user of the second terminal 230 does not receive the video call until the waiting time ends, the video call session may not be established between the first terminal 210 and the second terminal 230.

Figure 5:
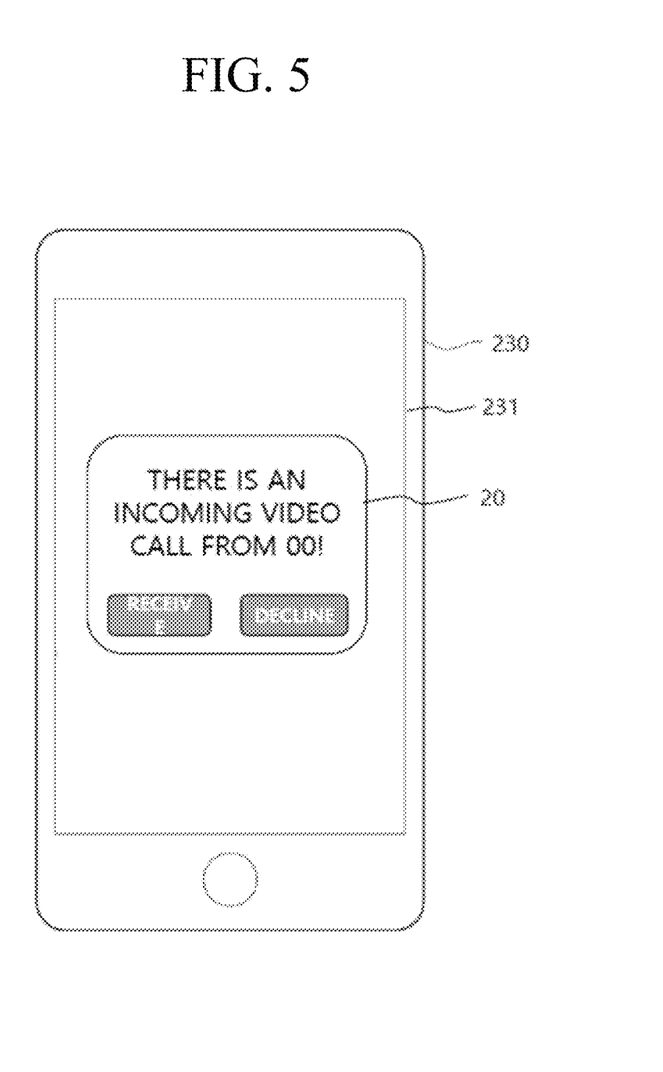
FIG. 5 is a view illustrating a video call waiting screen of a terminal, according to another embodiment of the present disclosure.

FIG. 5 is a view illustrating a video call waiting screen of a terminal, according to another embodiment of the present disclosure.

Referring to FIGS. 4 and 5, when the first terminal 210 and the second terminal 230 are matched, the second terminal 230 may receive the video call from the first terminal 210. During the video call waiting time, the display 231 of the second terminal 230 may display a video call notification message 20.

The video call notification message 20 may be displayed during the call waiting time. The user of the second terminal 230 may select to accept or decline the video call through the video call notification message 20 during the call waiting time.

Figure 6:
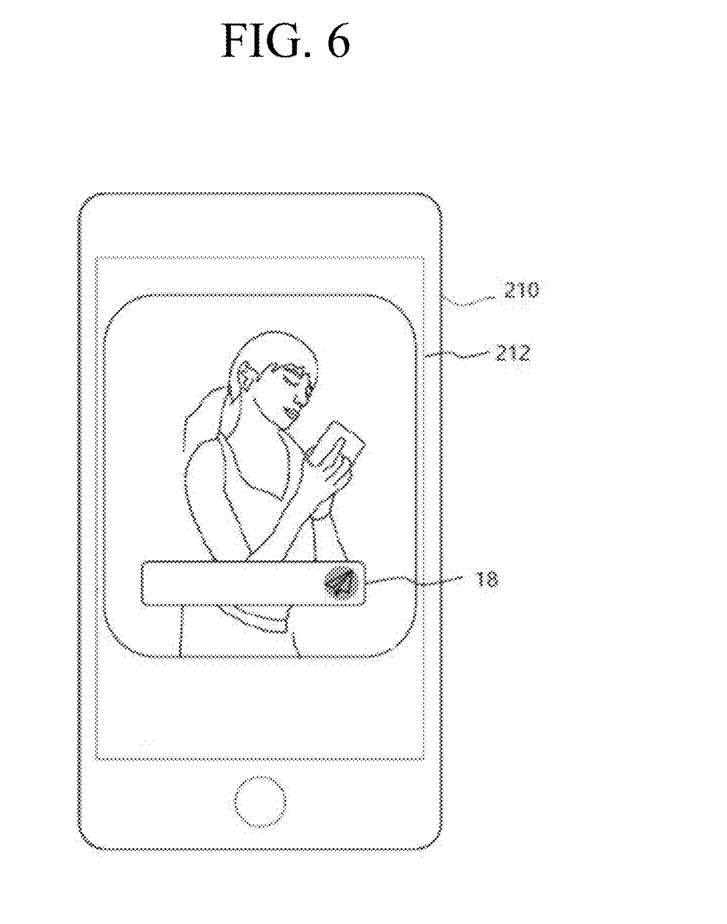
FIG. 6 is a view illustrating a screen displayed on a terminal when a video call is not established, according to an embodiment of the present disclosure.

FIG. 6 is a view illustrating a screen that is displayed on a terminal when a video call is not established, according to an embodiment of the present disclosure.

Referring to FIGS. 4 and 6, if the user of the second terminal 230 does not receive the video call until the waiting time ends, the video call session may not be established between the first terminal 210 and the second terminal 230. Further, the user of the second terminal 230 may decline the video call during the waiting time.

As such, if the video call session is not established between the first terminal 210 and the second terminal 230, a message window 18 may be displayed for the user of the first terminal 210 to send a message to the second terminal 230. As the message window 18 is displayed on the display 212 of the first terminal 210, even when the video call session is not established, a dialogue may be naturally induced between the user of the first terminal 210 and the user of the second terminal 230.

Figure 7:
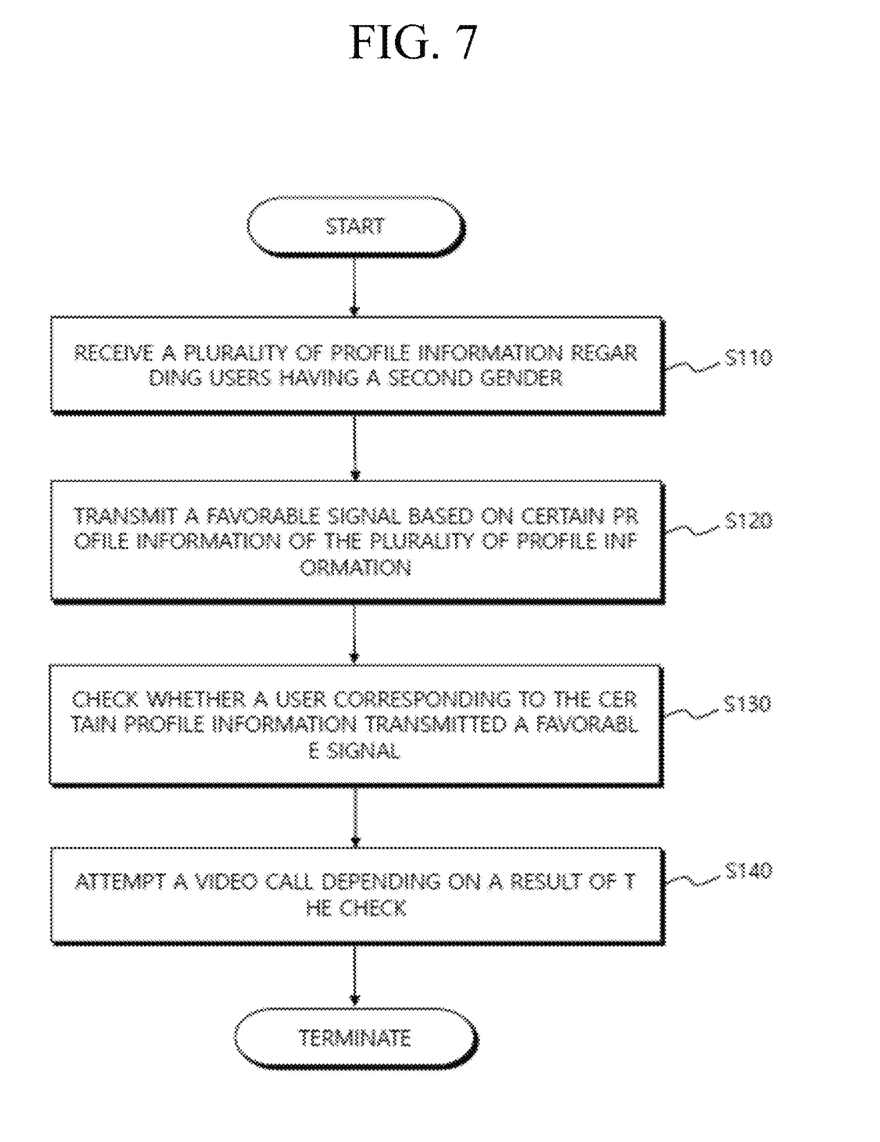
FIG. 7 is a flowchart illustrating an operating method of a terminal, according to an embodiment of the present disclosure.

FIG. 7 is a flowchart illustrating an operating method of a terminal, according to an embodiment of the present disclosure.

At step S110, when an application providing a mediation service is executed in the first terminal 210, the first terminal 210 may receive a plurality of profile information. For example, if the user of the first terminal 210 has a first gender, the first terminal 210 may receive a plurality of profile information regarding users having a second gender.

The first terminal 210 may sequentially output the received plurality of profile information.

At step S120, the first terminal 210 may transmit a favorable signal based on a certain profile information of the plurality of profile information. When the user of the first terminal 210 wishes to conduct a one-to-one communication with a user that provided the certain profile information, the user may select the favorability icon 11 displayed on the display 212.

When the user of the first terminal 210 selects the favorability icon 11, a favorable signal is generated, and the generated favorable signal may be transmitted to the server 100 or the terminal that provided the certain profile information.

At step S130, whether there is a history of receiving a favorable signal from the terminal that provided the certain profile information, may be checked. Before a favorable signal is generated in the first terminal 210, the first terminal 210 or the server 100 may check whether a favorable signal is generated in the terminal that provided the certain profile information based on the profile information of the user of the first terminal 210.

At step S140, depending on a result of the check, the first terminal 210 may attempt a video call to the terminal that provided the certain profile information.

If the first terminal 210 generates a favorable signal based on the certain profile information after receiving the favorable signal from the terminal that provided the certain profile information, the first terminal 210 and the terminal that provided the certain profile information may be matched.

When the first terminal 210 and the terminal that provided the certain profile information are matched, the first terminal 210 may attempt a video call to the terminal that provided the certain profile information.

During the video call waiting time, the display 212 of the first terminal 210 may display the certain profile information. In prior art, on the terminal sending the video call, images being photographed by the camera of the sending terminal used to be displayed during the video call waiting time. On the other hand, the first terminal 210 according to an embodiment of the present disclosure displays the certain profile information provided by the receiving side terminal (for example, the terminal that provided the certain profile information) during the video call waiting time, thereby using the waiting time more efficiently.

Further, the display 212 of the first terminal 210 may display the remaining waiting time. For example, if the video call waiting time is 10 seconds, the display 212 of the first terminal 210 may display a screen of sequentially counting down from '10' to '1'. If the user of the terminal that provided the certain profile information receives the video call before the waiting time ends, a video call session may be established between the first terminal 210 and the terminal that provided the certain profile information.

If the user of the terminal that provided the certain profile information does not receive the video call, or the terminal that provided the certain profile information declines the video call until the waiting time ends, the video call session may not be established between the first terminal 210 and the terminal that provided the certain profile information.

If the video call session is not established between the first terminal 210 and the terminal that provided the certain profile information, a message window 18 may be displayed for the user of the first terminal 210 to send a message to the terminal that provided the certain profile information. As the message window 18 is displayed on the display 212 of the first terminal 210, even if the video call session is not established, a dialogue may be naturally induced between the user of the first terminal 210 and the user of the terminal that provided the certain profile information.

As described with reference to FIGS. 1 to 7, users of the plurality of terminals 210~290 according to an embodiment of the present disclosure may be effectively matched with each other. Further, according to an embodiment of the present disclosure, the users of the plurality of terminals 210~290 may expand human relations through the mediation service.

The embodiments described hereinabove may also be implemented in the form of a recording medium including instructions executable by computer, such as program modules, executable by computer. A computer readable medium may be any available medium that can be accessed by computer, and may include both volatile and nonvolatile medium, removable and non-removable medium.

Further, the computer readable medium may include a computer storage medium or a communication medium. The computer storage medium may include volatile and non-volatile, removable and non-removable medium implemented in any method or technology for storage of information such as computer readable instructions, data structures, program modules or other data. The communication medium typically includes computer readable instructions, data structures, program modules, or other data of modulated data signals, such as carrier waves, or other transport mechanisms, and may include any information transmission medium.

Embodiments of the present disclosure have been described hereinabove with reference to the accompanying drawings, but those skilled in the art to which the present disclosure pertains will appreciate that the present disclosure can be implemented in other specific forms without changing its technical spirit or essential features. Therefore, the embodiments described hereinabove should be understood as illustrative in all respects and not restrictive.

What is claimed is:

1. A terminal operating method comprising:
receiving, by a first terminal, profile information from each of a plurality of terminals;
receiving, by the first terminal, a first signal from each of a subset of the plurality of terminals;
receiving, at the first terminal, a second signal generated by a user of the first terminal, wherein the second signal is a favorable signal associated with a user of a second terminal of the subset of the plurality of terminals;
upon determining that the first signal from the second terminal is a favorable signal received from the user of the second terminal, sending, by the first terminal, a video call request to the second terminal; and
displaying, during a waiting time after the sending of the video call request, a screen sequentially counting down the waiting time on the first terminal until the waiting time ends; and
when the video call request is not accepted before the waiting time ends, displaying a message window on the first terminal to send a message to the second terminal.

2. The terminal operating method according to claim 1, wherein the user of the first terminal has a first gender, and users of the plurality of terminals have a second gender.

3. The terminal operating method according to claim 1, further comprising, in response to the second terminal declining the video call request during the waiting time, displaying a message window on the first terminal to send a message to the second terminal.

4. The terminal operating method according to claim 1 further comprising transmitting a third signal from the first terminal to a second subset of the plurality of terminals prior to receiving the first signals, wherein the third signal is transmitted based on profile information received from the plurality of terminals, and profile information received from a certain terminal of the plurality of terminals comprises at least one of photographs, hobby information, nickname information, height information, date of birth information, gender information, residential area information, school information, and videos of a user of the certain terminal.

5. The terminal operating method according to claim 4, wherein the first signal is a favorable signal regarding the profile information received from a certain terminal of the plurality of terminals, and the second signal is a favorable signal regarding profile information of the user of the first terminal.

6. A non-transitory computer readable recording medium where a program for performing the method of claim 1, is recorded.

7. A terminal comprising:
a communication interface configured to communicate with a plurality of terminals;
an input/output interface configured to receive signals generated by a user of the terminal; and
a processor configured to:
receive, by the terminal, profile information from each of the plurality of terminals;
receive, by the terminal, a first signal from each of a subset of the plurality of terminals;
receive, at the terminal, a second signal generated by a user of the terminal, wherein the second signal is a favorable signal associated with a user of a second terminal of the subset of the plurality of terminals; and
if it determines that the first signal from the second terminal is a favorable signal received from the user of the second terminal, send, by the terminal, a video call request to the second terminal;
wherein, during a waiting time that begins after the sending of the video call request, the input/output interface displays a screen, on which the waiting time is sequentially counted down, until the waiting time ends; and
wherein, when the video call request is not accepted before the waiting time ends, the input/output interface displays a message window to send a message to the second terminal.

8. The terminal according to claim 7, wherein the user of the terminal has a first gender, and users of the plurality of terminals have a second gender.

9. The terminal according to claim 7, wherein, when a terminal receiving the video call request which is made by the processor does not accept the video call request before the waiting time, the input/output interface displays a message window to send a message to the second terminal.

10. The terminal according to claim 7, wherein the processor is further configured to transmit a third signal from the terminal to a second subset of the plurality of terminals prior to receiving the second signal from each of the plurality of terminals, wherein the third signal is transmitted based on the profile information received by the plurality of terminals, and the profile information received from a certain terminal of the plurality of terminals comprises at least one of photographs, hobby information, nickname information, height information, date of birth information, gender information, residential area information, school information, and videos of a user of the certain terminal.

11. The terminal according to claim 10, wherein the second signal is a favorable signal regarding the profile information, and the first signal is a favorable signal regarding profile information of the user of the terminal.

12. The terminal operating method according to claim 1, wherein receiving the first signal from each of the subset of the plurality of terminals comprises receiving the first signal through a server.

13. The terminal operating method according to claim 1, further comprising transmitting the second signal to the second terminal through a server.

14. The terminal operating method according to claim 1, wherein, if the user of the second terminal receives and accepts the video call request before the waiting time ends, a video call session is established between the first terminal and the second terminal.

15. The terminal according to claim 7, wherein, if the user of the second terminal receives and accepts the video call request before the waiting time ends, the communication interface initiates a video call session with the second terminal.

* * * * *